3,631,161
METHOD FOR CROSSLINKING ETHYLENE CONTAINING POLYMERS

You-Ling Fan, East Brunswick, and Richard G. Shaw, Califon, N.J., assignors to Union Carbide Corporation, New York, N.Y.
No Drawing. Continuation-in-part of applications Ser. No. 737,319, June 17, 1968, and Ser. No. 831,747, June 9, 1969. This application Feb. 5, 1970, Ser. No. 9,034
Int. Cl. C08f 27/00, 3/04, 3/06
U.S. Cl. 260—94.9 GA                    6 Claims

ABSTRACT OF THE DISCLOSURE

This invention covers crosslinking ethylene containing polymers with a silyl peroxide and novel crosslinkable compositions of an ethylene containing polymer and a silyl peroxide.

---

This application is a continuation-in-part of U.S. patent applications Ser. No. 737,319, filed June 17, 1968 and Ser. No. 831,747, filed June 9, 1969, both copending herewith.

This invention is concerned with crosslinking polymers which contain ethylene ($-CH_2-CH_2-$) units in the backbone thereof. More particularly, this invention relates to crosslinking the aforementioned ethylene containing polymers with a silyl peroxide.

In most cases involving crosslinking polymers, crosslinking is effected for the purpose of producing a relatively insoluble product. Moreover, a main element in crosslinking involves forming the uncrosslinked (or crosslinkable) polymer in combination with the crosslinking catalyst, if required, into the ultimate shape which the crosslinked product is to possess. After the shape has been obtained, sufficient heat is applied to the polymer to effect the necessary crosslinking for insolubilization. This last step is typically called curing.

In essentially all instances the crosslinkable polymers possess substantial molecular weight. Indeed, the greater the molecular weight of the polymer before crosslinking, the more desirable is the resulting crosslinked polymer. However, because of the typical instabilities of the catalyst employed for effecting crosslinking, the art is quite often required to utilize polymers of lower molecular weights which are liquid or plastic or soft in nature and therefore more useable at lower temperatures. Substantially superior products are obtained when the polymer which is to be crosslinked has exceptionally high molecular weight and can be crosslinked with a catalyst possessing thermal stability at the temperature at which the high molecular weight polymer is formed into the ultimate shape for the resulting crosslinked polymer. Since high molecular weight polymers are only effectively provided in the ultimate shape that the crosslinked polymer will possess by application of substantial heat alone or in combination with substantial pressure, the crosslinking agent which is utilized in combination with the polymer must be capable of withstanding such temperatures. For example, high density polyethylene which typically has a substantial molecular weight as well as a considerably higher melting point than conventional low density polyethylene cannot be crosslinked effectively with standard organic peroxide catalysts simply because the processing temperatures for shaping the high density polyethylene typically causes breakdown of the catalyst prior ot attaining the ultimate shape and this results in premature crosslinking and the inability to form the desired shaped product.

Crosslinking polymers containing ethylene as a recurring unit thereof is well-known. Typically, such crosslinking reaction is effected by free radical mechanisms. The usual free radical catalyst employed for effecting such crosslinking are peroxides. A particularly illustrative case where the crosslinking finds commercial value invovles the crosslinking of polyethylene when used as a coating for wire and cables. In that instance, dicumyl peroxide is the peroxide of choice and it is incorporated in a low density polyethylene resin either by milling the peroxide into the resin or by absorbing the peroxide onto the surface of the resin. In this regard, note U.S. Pats. Nos. 2,888,424 and 3,455,752. In the commercial production of crosslinked polyethylene, dicumyl peroxide is essentially the only peroxide crosslinking agent employed. Until this invention, no other peroxide possessed the desirable qualities of dicumyl peroxide such as relatively good thermal stability, high crosslinked density in the resulting polyethylene coating and relatively good processing characteristics in the manufacture of a crosslinked polyethylene coating. As advantageous as dicumyl peroxide is in effecting crosslinking of polyethylene, it is not without its problems during use. For example, its temperature stability is not sufficiently high enough to avoid some premature crosslinking when mixed in the polyethylene. In addition, it is susceptible to the formation of relatively large amounts of acetophenone when decomposed to effect the free radical mechanisms for the crosslinking. Acetophenone has an unpleasant and irritating odor which lingers for a long time after the polyethylene has been crosslinked. In the case of crosslinking polyethylene, other organic peroxides are less desirable than dicumyl peroxide even though some of them do not form by-products having obnoxious odors. They are deficient in effecting crosslinking for a number of reasons such as excessively low temperature stability, that is, they decompose at too low a temperature to withstand processing conditions, they do not effectively crosslink the polyethylene to obtain the crosslinking density needed and the like problems.

With respect to crosslinking of other polymers which contain ethylene units therein, wholly organic peroxides and hydroperoxides suffer from a number of deficiencies in effecting the fre radical source needed for crosslinking. The temperature instability characteristics of wholly organic peroxides and hydroperoxides causes a number of processing problems during the incorporation of the hydroperoxide or peroxide in the polymer. Such processing problems include, for example, premature reaction caused by temperature instability of the peroxide, difficulty in obtaining uniform distribution of the peroxide in the polymer, limited degree of crosslinking achieved, and the like.

In many cases, such ethylene containing polymers which are crosslinked contain within them reinforcing substances such as fillers or fibers. In the case of such reinforced ethylene containing polymers it is most desirable to enhance the bonding relationship between such reinforcing materials and the polymers. However, most ethylene containing polymers are relatively inert materials. That is, they do not contain groups which tenaciously bond to the reinforcing material. In cases where the ethylene containing polymer contains functional pendant groups which are capable of some reaction with some fillers, the most desired fillers oftentimes do not contain surface groups which are amenable to significant reaction with such functional groups to achieve tenacious bonding. Thus, it is most desirable to provide in the ethylene containing polymer a material which enhances such bonding relationship regardless of whether the ethylene containing polymer contains functional pendant groups and the reinforcing material contains surface capable of reactivity with functional groups possessed by the ethylene containing polymer.

There is described herein a method of crosslinking the aforementioned ethylene containing polymers with a peroxide catalyst which can possess essentially any desired thermal stability and can be designed to possess a thermal stability which exceeds the temperature at which the particular ethylene containing polymer is shaped into the configuration in which crosslinking is effected. These peroxides crosslinking agents are characterized as silyl peroxides, that is, they possess as an integral part thereof ≡Si—O—O—R, wherein R is hydrogen or an organic radical bonded to the peroxy oxygen by a non-carbonyl carbon atom. Such silyl peroxides when included in the aforementioned ethylene containing polymers can effect crosslinking at temperatures not heretofore suitable with the commercially employed organic peroxides. Because such silyl peroxides possess exceptionally high temperature stability, that is, they do not decompse at relatively low temperatures and decompose at higher temperatures than organic peroxides which contain the same or comparable moieties therein, one may employ them in polymers having higher molecular weights or higher melting points because higher temperatures can be employed in the processing of such polymers without premature crosslinking. In addition, the silyl peroxides of this invention provide the capability of improving the bonding of the polymer to any substrate which it contacts when being cured or improving the effectiveness of any filler or fiber or other reinforcing material contained therein by enhancing the bonding between the polymer and the reinforcing material.

The silicon peroxides of this invention used to effect the desired crosslinking are those characterized by the formula:

(I) $R''_n Si_x (O)_y (R')_z R'''_a$ wherein R'' is a monovalent inorganic or organic radical; R' is a mono- or polyperoxy radical, such as ROO— and —OOR$^t$OO—, where R is hydrogen or a monovalent organic radical bonded to the peroxy oxygen by a non-carbonyl carbon atom, such as alkyl, aralkyl, cycloalkyl, aryl, cycloalkyl and the like; R$^t$ is a divalent organic radical of a dihydroperoxide of such divalent organic radical; R''' is a non-peroxy containing divalent organic radical; $n$ is 0 through 3 multiplied by $x$; $x$ is 1 to a large number; $y$ is 0 or equal to the equation $$\frac{x(4-n-z-a)}{2}$$

$z$ is at least 1 and $a$ is 0 or equal to the equation $$\frac{x(4-n-z-a)}{2}$$

Preferably, $x$ is a number typically not greater than 25, more preferably, it is a number not greater than 5, and most preferably, it is equal to 1.

Illustrative of R'' are any monovalent inorganic radicals such as hydrogen, hydroxyl, alkali metal oxide (such as NaO, KO, LiO), amino, and the like, and any organic radicals such as alkyl (e.g., methyl, ethyl, pentyl, dodecyl, octadecyl, 2-ethylhexyl, and the like), cycloalkyl (such as cyclobutyl, cyclohexyl, 4-methylcyclohexyl, and the like), aryl (such as phenyl, 2-naphthyl, 2-anthracyl, biphenyl, and the like), alkaryl (such as 4-methylphenyl, 2,4-diethylphenyl, 4-dodecylphenyl, and the like), aralkyl (such as phenylethyl), alkenyl (such as vinyl, allyl, 3-butenyl, oleyl, and the like), alkadienyl (such as 1-butadienyl - 1, 4,1 - octadecatrienyl - 9, 11,13,1-neophenyl, and the like), cycloalkenyl (such as 3-cyclohexenyl), haloalkyl (such as chloromethyl, gamma-chloropropyl, 3,3,3-trifluoropropyl, perfluoropropyl), haloaryl (such as 4-chlorophenyl, 2,4-dichlorophenyl, chloronaphthyl), halocycloalkyl (such as 4-chlorocyclohexyl), alkoxy (such as methoxy, ethoxy, propoxy, dodecyloxy, isopropoxy, and the like), aryloxy (such as phenoxy, napthyloxy, biphenyloxy, and the like), alkylamino and arylamino (such as methylamino, diethylamino, phenylamino, and the like), and any organofunctional radical such as hydroxyalkoxy (such as beta-hydroxyethoxy, gamma-hydroxypropoxy, and the like); hydroxyalkoxyalkoxy (such as beta-hydroxyethoxyethoxy, omega-hydroxy(polyethyleneoxy)ethoxy, omega-hydroxy-(poly-1,2-propyleneoxy), and the like; cyanoalkoxy (such as beta-cyanothoxy, beta-cyanohexoxy, and the like); cyanoalkoxyalkoxy (such as beta-cyanoethoxyethoxy, omegacyanoethoxy-(polyethyleneoxy), omega-cyanoethoxy(poly-1,2-propyleneoxy), and the like); carboxyalkoxy (such as beta-carboxyethoxy, beta-carboxyhexoxy, and the like); haloalkoxy (such as chloromethoxy, bromoethoxy, perfluropropoxy, and the like); cyanoalkyl (such as beta-cyanoethyl, gamma-cyanopropyl, and the like); cyanoaryl (such as 4-cyanophenyl); cyanocycloalkyl (such as 4-cyanocyclohexyl, 3-cyanocyclopentyl, and the like); carboxyalkyl (such as beta-carboxyethyl, gamma-carboxypropyl, and the like); carboxyaryl (such as 4-carboxyphenyl); carboxycycloalkyl (such as 4-carboxycyclohexyl, 3-carboxycyclopentyl; and the like); isocyanatoalkyl (such as gamma-isocyanatopropyl, delta-isocyanatobutyl, and the like); isocyanatoaryl (such as 4-isocyanatophenyl); isocyanatocycloalkyl (such as 4-isocyanatocyclohexyl); alkyl or aryl carboxyalkyl (such as beta-methylcarboxyethyl, gamma-phenyl carboxy propyl, and the like); hydroxyalkyl (such as hydroxymethyl, gamma-hydropropyl, and the like); hydroxy(polyalkyleneoxy)alkyl (such as omega-hydroxy(polyethyleneoxy)propyl, and the like), alkenylcarbonyloxyalkyl (such as gamma-acryloxypropyl, gamma-methacryloxypropyl, and the like); epoxyalkyl (such as 1,2-epoxyethyl, 1,2-aminoaryl and aminoalkyl (such as beta-aminoethyl-gamma-aminopropyl, aminomethyl, gamma-aminopropyl, delta-aminobutyl, p-aminophenyl); and the like.

Illustrative of R''' is any divalent organic radical which is joined to silicon at each free valence, such as alkylene (such as methylene, ethylene, n-hexylene, 2-ethyl-n-hexylene, and the like); arylene (such as 1,4-phenylene, 1,3-phenylene, 1,5-naphthylene, and the like), cycloalkylene (such as 1,4-cyclohexylene, 1,3-cyclohexylene, 1,3-cyclobutylene, and the like), and such divalent organic radicals as

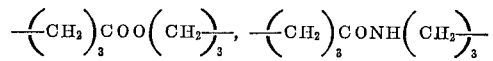

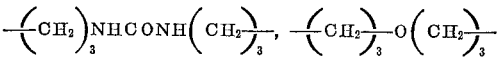

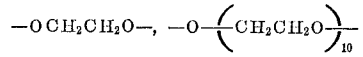

and the like.

R' may be characterized as the residue of the hydroperoxides having the formulas

and

obtained by the abstraction of hydrogen from the peroxy oxygen. Illustrative of such hydroperoxides are the following: hydrogen peroxide; methyl hydroperoxide; ethyl hydroperoxide; propyl hydroperoxide; isopropyl hydroperoxide; n-butyl hydroperoxide, sec-butyl hydroperoxide, t-butyl hydroperoxide; t-amyl hydroperoxide; 1,1-diethylpropyl hydroperoxide; 1,1,2-trimethylpropyl hydroperoxide; 1-methylhexyl hydroperoxide; 1,1,2,2-tetramethylpropyl hydroperoxide; cyclohexyl hydroperoxide; 4-methylcyclohexyl hydroperoxide; trans-decalin hydroperoxide (transdecahydro-4α-naphthyl hydroperoxide); hexahydro-3α-indanyl hydroperoxide; 2,5-dihydroperoxy-2,5-dimethylhexane (2,5-dimethylhexylidene 2,5-hydroperoxide); 2,7-dihydroperoxy-2,7-dimethyloctane (2,7-dimethyloctylidine 2,7-hydroperoxide); 2-hydroperoxy-2,4-dimethyl-3-pentanone; 1,1,6,6-tetrahydroperoxy-cyclodecane; 2-cyclopenten-1-yl hydroperoxide; 2-cyclohexen-1-yl hydroperoxide; 2-methyl-2-cyclohexen-1-yl hydroperoxide; 2,3-dimethyl-2-cyclohexen-1-yl hydroperoxide; d,1-3-p-menthenyl-8-hydroperoxide; 3-methyl-3-hydroperoxy-1-butyne (1,1-dimethyl-2-propynyl hydroperoxide); 2,5-dimethyl-2,5-dihydroperoxy-3-hexyne (1,1,4,4-tetramethyl-2-butynylenedihydroperoxide); α-methylbenzyl hydroperoxide; cumene hydroperoxide (α,α-dimethylbenzyl hydroperoxide); α-methyl-α-ethyl-benzyl hydroperoxide; α-p-xylyl hydroperoxide; diphenylmethyl hydroperoxide; triphenylmethyl hydroperoxide; tetralin hydroperoxide (1,2,3,4-tetrahydro-1-naphthyl hydroperoxide); 1,2,3,4-tetrahydro-1-methyl-1-naphthyl hydroperoxide; 9-fluorenyl hydroperoxide; 1-indanyl hydroperoxide; tetrahydro-2-furfuryl hydroperoxide; and tetrahydrocarbazole hydroperoxide (1,2,3,4-tetrahydro-4α-H-isocarbazol-4α-yl hydroperoxide) and 2,3-dimethyl-3-hydroperoxy butene-1.

As can be seen from the above description of the silyl peroxide compounds of this invention, they may be in the form of a monomer or polymer, e.g., silane, siloxane, or silicane, in fact any silicon-containing compound which contains an organoperoxy group bonded to silicon, which organo moiety is bonded to the peroxy oxygens and thence to the silicon by a non-carbonyl carbon atom.

The silicon peroxides are obtained by the procedures described hereinafter.

Suitable and preferred processes involve forming an immiscible mixture of an isolated pre-formed adduct of triethylenediamine or hexamethylene tetraamine and a hydroperoxide with a silicon halide dissolved in a solvent therefore but not for the adduct, then separating the insoluble triethylenediamine hydrohalide salt or the insoluble hexamethylene tetraamine hydrohalide salt formed therein to obtain a solution of the silicon peroxide, provided that when hexamethylene tetraamine is employed, there is provided in the mixture a metal complexing agent and is separated from the mixture after formation of the hexamethylene tetraamine hydrohalide salt.

In the following discussions, the aforementioned adducts of either triethylenediamine or hexamethylene tetraamine and a hydroperoxide will be referred to, collectively, as amine or hydroperoxide adducts.

Other processes for the production of silyl peroxides involve, for example, a straight reaction between a halo silane and the hydroperoxide. This straight reaction results in extremely small yields indicating a less efficient reaction. The art has defined the use of a number of catalysts which are used in stoichiometric portions and enter into the by-product formation. These aid the reaction and improve the yields over those obtainable in the straight reaction. Normally, these catalysts are amine bases and their reaction involves formation of amino hydrohalide by-products which are in solution and/or thorough admixture with the resulting peroxy silane. In order to separate the peroxy silane, recourse is needed to distillation or crystallization procedures. Other methods involve the reaction of silylamines with hydroperoxides. The yields from this process are extremely low and the process involves expensive procedures to separate the amino-hydrohalide by-product from the silyl peroxide. Though these known procedures are inefficient, providing low yields, and are susceptible to violent explosions and substantial impurity formation, they can be employed for the purposes herein to produce silyl peroxides. The preferred processes achieve yields significantly superior to the known processes, usually above about 50 weight percent to 100 weight percent, based upon the weight of hydroperoxide employed.

The usable silicon halides in these processes, broadly speaking, encompasses any solvent soluble silicon containing compound which possesses halogen bonded directly to the silicon atom. The silicon compound may contain a plurality of halogen bonded to silicon and/or a plurality of silicon atoms, each of which possesses halogen. Generally speaking, it is desirable that the silicon halide possess a molecular weight not in excess of about 50,000, preferably less than 20,000, and most preferably it is a silicon compound which contains not more than 5 silicon atoms therein. The remaining valences of the silicon atom, that is, those valences which are not taken up by halogen, may be bonded to any group, organic or inorganic. Illustrative silicon halides are those encompassed by the following general formula:

(II) 

R'', R''', n, x, y, z, and a are described above; and X is halogen such as chlorine, bromine and fluorine.

The varieties of silicon halides usable in the practice of this invention are great, as illustrated above, and the only requirement thereof is that they contain halogen bonded directly to silicon. The term "silicon halide," as employed herein, encompasses silanes, siloxanes, and the like.

The hydroperoxides employable in these processes are illustrated above.

Usable solvents in the preferred processes are those in which the silicon halide is soluble and the resulting amine hydrohalide by-product is not soluble. Also it is desirable that the adduct of the hydroperoxide be insoluble in the solvent. The solvent should be one which does not interfere with the reaction. Therefore, it is typically desirable not to employ a highly polar solvent. The process of this invention works admirably with solvents such as liquid hydrocarbons, e.g., mineral spirits, n-hexane, 2-ethyl-n-hexane, n-heptane, n-octane, n-dodecane, toluene, xylene, benzene, mixed hydrocarbon fractions, and the like. Marginally, polar solvents well known to those in the art can be employed, though they are not preferred over the aforementioned hydrocarbons. It is believed that an extremely polar solvent will, to some degree, interfere with the reaction to adversely effect the yields obtained. However, this does not mean that such polar solvent cannot be employed in the practice of this invention to the extent that they do not adversely effect the yield of product. Thus, to some extent, one may employ ketones, amides, sulfoxides, esters, aldehydes, and the like polar solvents.

It is desirable to effect good mixing between the reactants so as to insure complete reaction, but this is not a critical feature. To some extent it may affect the yield or rate of reaction.

The temperature at which reaction is effected may range from a temperature below 0° C. at which the silicon halide has at least some solubility in the solvent employed to a temperature above 0° C. at which the hydroperoxide amine adduct exhibits instability, that is, starts to decompose at a relatively fast rate. By relatively fast rate, that means a temperature at which the decomposition runs at a rate faster than the reaction between the silicon halide and the hydroperoxide. Preferably, the temperature employed is in the range of from about —80° C. to about 100° C., most preferably —20° C. to 60° C. Usually, the reaction is carried out in a comfortable temperature range of about 0° C. to about room temperature, that is 25° C.

Because the reaction mixture is a heterogeneous mixture, some mixing between the reactants employed is desirable. However, when the amine hydroperoxide adduct is made into a fixed bed, then simple flowing of the silicon halide solution through the bed will usually be sufficient to effect the desired reaction.

The preferred processes involve exothermic reactions and therefore it is desirable to maintain the temperature of the reaction at the levels at which most favorable results are achieved. This is within the skill of the experimenter in the manufacture of a given silyl peroxide and heat withdrawal methods such as conduction, radiant, or convection cooling may be employed in order to effect a measure of control over the process. Other than this factor, as well as those previously described, these processes operate with considerable ease and facility.

In the case with the use of the hexamethylene tetraamine adduct with the hydroperoxide, it is complexed (or is believed to be complexed) with a polyvalent metal salt of an acid preferably an acid having a pH lower than 5. The polyvalent metals, when incorporated with hexamethylene tetraamine in the formation of its adduct with the hydroperoxide, have been found to enhance significantly the yield of silyl peroxide. In the absence of such polyvalent metal salts, the yields obtainable typically do not exceed 50 percent, based upon the weight of hydroperoxide employed, whereas when the polyvalent metal salt is employed in the formation of the adduct and kept present during the formation of the silyl peroxide, the yields obtained of silyl peroxide, in almost all cases, exceed 50 percent, based upon the weight of the hydroperoxide employed.

The polyvalent metals employable are those of Group II-A of the Periodic Chart having atomic numbers from 12 through 56, and Groups I-B and II-B having atomic numbers of from 29–48. The "Periodic Chart" employed herein can be found at pages 58 and 59 of Lange's Handbook of Chemistry, 6th edition, 1946, published by Handbook Publishers, Inc., Sandusky, Ohio.

The anion of the polyvalent metal salt is desirably derived from a strong acid such as acetic, trichloroacetic, sulfuric, hydrochloric and the like acids. Illustrative metals include, by way of example, magnesium, calcium, strontium, barium, copper, zinc, silver, cadmium, and the like.

The mole amount of metal salt employed is desirably at least equal to the mole amount of hexamethylene tetraamine used in forming the adduct. Usually, a 10 to 50 mole percent excess of the metal salt is employed in the process.

The preferred processes have admirable and most advantageous qualities in that the amine hydrohalide byproduct is readily separated from the silicon peroxide product by simply precipitating or filtering it from the solution of silicon peroxide product. Centrifuging of the amine hydrohalide salt may also be employed to insure maximum separation of the two.

The adducts of the hydroperoxide and these amines can be effected by simple admixture of the two reactants. These hydroperoxy amine adducts can be made in a variety of ways. A most suitable method is described in U.S. Pat. 3,236,850, patented Feb. 22, 1966.

Preferred crosslinking agents are peroxysilanes characterized by the formula:

(III)    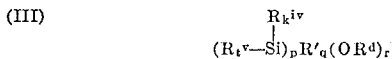

wherein $R^{iv}$ is alkyl of 1 to 5 carbon atoms (such as methyl, ethyl and amyl) and phenyl; $R^v$ is hydrogen; alkyl having from about 1 to 5 carbon atoms (such as methyl, ethyl and amyl); aryl (such as phenyl, naphthyl, and the like); vinyl; allyl; isocyanatoalkyl of 3 to 6 carbon atoms in the alkyl group, at least 3 of which are in sequential order separating the isocyanato moiety from the Si; glycidyloxypropyl; beta-(3,4-epoxycyclohexyl); gamma-mercaptopropyl; and gamma-methacryloxypropyl; R' is described above; $R^d$ is alkyl of 1 to about 8 carbon atoms, phenyl or acyl (such as acetyl, propionyl, and the like); $p$ is equal to the free valence of R'; $q$ is 1, 2, 3 or 4; $k$ is 0 or 1; $r$ is 0 or at least 1 and in any case is less than $p(4-q-k-t)$; $t$ is 0, 1, 2 or 3; and the sum of $t$, $k$, $q$ and $r$ does not exceed the value of $4 \times p$.

These silyl peroxides are obtainable by the above processes by the reaction of halosilanes of the formula:

(IV)    

wherein X is a halogen such as chlorine, fluorine and bromine, with the aforementioned amine adducts with or without the presence of an alkali metal salt of the formula $ZOR^d$, wherein Z is an alkali metal, such as, sodium, lithium and/or potassium.

The process employed involves adding to a solvent solution of the silane of Formula IV the hydroperoxide amine adduct alone or in admixture with the alkali metal salt of an alkanol and/or phenol and/or a carboxylic acid. The mixture typically contains a proportion of each component corresponding to the amount of substitution preferred on the silane. For example, if a vinyl or allyl trihalo slane is desired to be converted to vinyl methoxydiperoxy silane, then the ratio of a monohydroperoxide-amine adduct to the alkali metal salt of methanol would be 2:1, basis equivalent ratio of peroxy group to hydroxy group. If a triperoxy compound is desired then the alkali metal salt of methanol is not employed. The product of the reaction can be a mixture of products varying in $R^dO$-content and peroxy content, and by simple distillation, it is possible to separate each such product from the others to obtain the desired and intended reaction product.

Illustrative of $ZOR^d$ are the alkali metal alkoxides, phenates, and acylates such as, sodium methoxide, lithium ethoxide, potassium n-propoxide, sodium phenate, sodium - 4 - methylphenate, potassium (beta-methoxy) ethoxide, sodium (beta-ethoxy)ethoxide, sodium acetate, lithium acetate, potassium acetate, sodium formate, lithium propionate, sodium benzoate and the like. Preferably, $R^d$, when aliphatic contains typically not more than about 8 carbon atoms, and when aromatic, it is monocyclic and contains typically not more than about 14 carbon atoms.

Since the peroxide radicals of the silanes of Formula III are relatively stable towards hydrolysis and condensation under mild conditions of acidity or alkalinity, it is possible to hydrolyze the organooxy moieties of the silicon compound i.e., $R^dO$, to form siloxanes containing reoccurring siloxy and peroxy groups. Thus, there are obtainable by straight forward hydrolysis and condensation products having the formula:

(V)    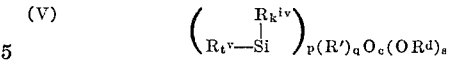

wherein $R^v$, R', $R^d$, $R^{iv}$, and $p$, $t$, $k$, and $q$ are described above, $e$ is equal to the equation $$\frac{p(4-q-t-k)}{2}$$

and $s$ is equal to the equation $p(4-q-2.e-t-k)$.

Hydrolysis is accomplished by mixing the silicon compound or Formula III in water at a pH typically not lower than 5 and not greater than 9, preferably not less than 5.5 and not greater than 8.5. Condensation is effected by heating the hydrolyzate at a temperature below the peroxide decomposition temperature for a sufficient period of time to effect removal of $OR^d$ groups. This may be accomplished by coating the hydrolyzate on the surface of solid polymeric particles to be crosslinked after fusion and heating the coated surface at a temperature sufficient to evaporate water from the surface. It is preferred that hydrolysis be conducted at a pH as close as 7 as possible, such as about 6.5 to 7.5.

The polymers which may be crosslinked with the silyl peroxide catalysts of this invention include any of those polymers which possess ethylene units in the backbone thereof. Preferably the polymers are free of ethylenic or acetylenic unsaturation therein.

The term "crosslink," "crosslinking," and "crosslinked" as employed herein and in the claims means increasing of the molecular weight of a polymer by causing interbonding of the molecules thereof and in addition altering the solubility characteristics of the polymer so that the crosslinked polymer possesses a degree of less solubility in one or more solvents in which the polymer was soluble to at least some degree prior to crosslinking. A "fully crosslinked" polymer is one in which its solubility has been materially altered by the crosslinking reaction and typically is relatively insoluble in essentially all organic solvents.

Illustrative of the aforementioned ethylene containing polymers which can be crosslinked pursuant to this invention include high and low density polyethylene, interpolymers of ethylene with one or more of essentially any other copolymerizable, ethylenically unsaturated monomer such as 1,2-propylene; 1,2-butylene; 5-ethyl-2-hexylene; vinyl acetate; vinyl chloride; vinylidene chloride; vinyl fluoride; vinylidene fluoride; N-vinylpyrrolidone; vinyl pyridine; N-vinylcaprolactam; 2 - norbornene; 5-ethylidene- 2 - norbornene; 5-methylidine-2-norbornene; cyclopentadiene; cyclohexane, styrene; alpha-methyl-styrene; 4-chlorostyrene; 1 - propenyl benzene; 1,4-divinylbenzene; vinyl trichlorosilane; allyltrichlorosilane; the vinyl phosphines; phosphonates; and other phosphorous compounds; acrylic acid; alkyl acrylates (e.g., ethyl acrylate, n-butyl acrylates, 2 - ethylhexyl-acrylate, and the like); methacrylic acid; alkyl methacrylates (e.g., methyl methacrylate, octyl methacrylate, and the like); maleic acid and anhydride; fumaric acid and anhydride; the maleates and fumarates (particularly the alkyl esters of from 1–8 carbon atoms); diallylphthalate; gamma-methacryloxypropyl(trimethoxy) silane; acrylamide; methacrylamide; maleimide; methyl vinyl ether; ethyl vinyl ether; ammonium, sodium and potassium salts of maleic acid, fumaric acid, acrylic acid or methacrylic acid; butadiene - 1,3; chloroprene; isoprene; tetraallylsilane; tetraallylsilicate; tetraallyltitanate; diallylcarbonate; and the like. The above interpolymers include copolymers, terpoymers, etc. and are illustrated by the following preferred interpolymers: copolymers of ethylene with vinyl acetate, vinyl chloride, vinyl fluoride, acrylic acid, methacrylic acid, ethylacrylate, propylene, methyl methacrylate, and the like; terpolymers of ethylene with vinyl acetate and acrylic acid, vinyl acetate and vinyl alcohol (obtained by partial saponification and hydrolysis of an ethylene-vinyl acetate copolymer), and the like. In fact, any polymer containing at least about 10 weight percent of $-CH_2-CH_2-$ in the polymer is capable of being effectively crosslinked by the silyl peroxides.

The preferred ethylene containing polymers are those which possess a molecular weight in excess of about 5,000, preferably in excess of about 20,000. Usually, the ethylene content of the polymer based on the total weight of the polymer, exceeds about 30 weight percent. In the preferred practice of this invention, certain of the silyl peroxides have been found to be more effective in crosslinking the ethylene containing polymer. It has been determined that in the case of silyl peroxides which contain only one silicon atom and all the valences thereof are bonded to organo groups by a carbon to silicon bond and peroxy groups, that optimum crosslinking is effected when there is only one peroxy group bonded directly to Si and the remaining valences of the silicon are such organo groups. Somewhat less effective in crosslinking the ethylene containing polymers are those silicon peroxides containing two peroxy groups to a single silicon atom. In the case of three peroxy groups bonded to the silicon atom and the remaining valence is bonded to an organo group, it has been found that these particular silyl peroxides, though less effective in crosslinking the ethylene containing polymer of the silyl peroxides, are most effective in achieving better bonding to reinforcing materials incorporated in the ethylene containing polymer and/or to a substrate which the polymer contacts during curing. In the practice of this invention, one may utilize a combination of these different types of silyl peroxides to achieve the most favorable results. For example, if the ethylene containing polymer is reinforced with a filler or a fiber, then a combination of a silane containing one peroxy group and the remaining valences of the silicon atom containing the aforementioned organo groups may be combined with a silane containing two to three peroxy groups per silicon atom. Such a combination provides a duel effectiveness in crosslinking the ethylene containing polymer and providing the desired coupling to the reinforcing material.

Suitable reinforcing materials include the usual fillers and fibers. Examples of filler materials include particulate materials such as wood flour, glass beads, the usual inorganic fillers and pigments such as the silica fillers (e.g., hydrated silica, fumed silica, and the like), alumina, hydrated alumina, calcium carbonate, carbon black, titanium dioxide, ferric oxides, lead oxides, lead chromates, iron chromates, zinc oxide, and the like materials.

Suitable fibers for reinforcing the aforementioned ethylene polymers include, by way of example, glass fiber, nylon fibers (such as polyhexamethylene adipamide and polycaprolactam), polyester fibers (such as polyethyleneterephthalate, and the like), cellulosic fibers (such as wood pulp, cotton, rayon, cellulose triacetate, cellulose acetate), wool, polypropylene, the acrylic and modacrylic fibers (e.g., polyacrylonitrile and copolymer of acrylonitrile and vinyl chloride), and the like fibers.

In some instances, it is desirable to incorporate with the silyl peroxides the usual boosters which are employed with organic peroxides to increase the degree of crosslinking achieved by free radical polymerization. Such boosters encompass compounds which possess a plurality of unsaturation therein, such as divinyl benzene, tung oil, diallyl dimethyl silane, diisopropenyl benzene, diallyl diphenyl silane, and 2,4,6-tris (allyloxy)-s-triazine, and the like compounds.

These boosters may be incorporated into the polymer, based on the weight thereof in amounts ranging from about 0.05 to about 3.5 weight percent, though preferably they are employed in the range of about 0.1 to about 2 percent based on the weight of the polymer. The silyl peroxide may be incorporated into the polymer in amounts ranging from about 0.1 to about 10 weight percent, based on the weight of the polymer. In most instances, the amount of silyl peroxide added to the polymer will range from about 1 weight percent to about 4 weight percent.

The boosters also serve to lower the decomposition temperature of the peroxide. However, one may employ the accelerators usually used to effect more rapid decomposition of organic peroxides. These accelerators serve the purpose of reducing the half life of the peroxide causing its decomposition to be effected at a more rapid pace. A typical accelerator includes cobalt stearate, manganous acetylacetonate, and various metal salts, preferably transition metal salts, of organic carboxylic acids and weak inorganic acids. The amounts by weight one may employ of these accelerators is within the range described above for the amounts of booster one may employ.

The amount of reinforcing material (e.g., fibers or fillers) which one may employ may range from an amount as low as about 5 weight percent of the polymer to an amount equal in weight to that of the polymer. In some instances the amount of reinforcing materials may exceed the weight of the polymer. In these cases where fibers are used for reinforcing purposes it is preferred that the amount of fibers incorporated in the polymer does not exceed about 30 weight percent based on the weight of the polymer employed.

Blending the silyl peroxide with ethylene containing polymer can be effected by conventional procedures, such as mentioned previously. In most cases, selection of the preferred procedure is dependent upon the physical state and properties of the polymer and polymer constituents. For example, if the polymer is solid, it can be coated with small quantities of the silyl peroxide, generally by spray coating a solvent solution of the silyl peroxide onto the surface of particles of the polymer followed by evaporation of the solvent. If the silyl peroxide is a liquid of low viscosity, it can be sprayed neat (100% solids) onto the particles of the polymer. If the melting point of the polymer is below the decomposition temperature of the silyl peroxide or if the polymer or one of its components is liquid, then the silyl peroxide can be melt mixed or blended in the polymer or one of its components. Whichever procedure is employed, it is important and most desirable to avoid initiation of decomposition of the silyl peroxide during the blending operation. However, if the polymer is to be crosslinked soon after blending with the silyl peroxide, some decomposition of the silyl peroxide is permissible.

Solvents usuable for dissolving silyl peroxides to facilitate blending with the polymer can be any liquid in which the peroxide is soluble. Illustrative solvents include by way of example aromatic hydrocarbons (e.g., xylene, toluene, benzene, naphthalene, and the like), aliphatic hydrocarbons (e.g., n-hexane, n-octane, n-nonane, n-dodecane, mineral spirits, and the like), ether solvents (e.g., diethyl ether, di-n-butyl ether, tetrahydrofurane, dioxane, and the like), amides (e.g., N,N-dimethylformamide, N,N-dimethylacetamide, and the like), ketones (e.g., dimethyl ketone, methylethyl ketone, methyl isobutyl ketone, and the like), esters (e.g. ethylacetate, isopropylacetate, isobutylacetate, methylpropionate, and the like), and like type solvents.

Special reference should be made to crosslinking a copolymer of ethylene and acrylic acid containing substantial quantities of acrylic acid therein, based on the weight of the polymer. Polymers of ethylene and acrylic acid containing from about 15 weight percent to about 55 weight percent can be rendered water soluble when the acrylic acid mers are converted to essentially monovalent salts such as alkali metal salts (e.g., sodium, potassium, cesium, rubidium, and the like), ammonium salts (e.g., ammonium, quaternary ammonium, such as tetramethylammonium, benzyltriethylammonium, and the like), amine salts (e.g., triethylamine, diethylamine, diethanolamine, and the like), and the like. These water soluble copolymeric salts find substantial utility as a mechanism for using such copolymers in a cheap solvent such as water. When the aforementioned silyl peroxides are utilized in the conversion of these copolymers to crosslinked structures, it is desirable to utilize as the peroxide the hydrolyzable silyl peroxides such as those which contain alkoxy or acetoxy groups as well as peroxy groups bonded directly to Si. Particularly preferred are the silanes of Formula III above wherein r is at least one. When incorporated into the aqueous copolymer solution or dispersion of in the salt form, the alkoxy groups are hydrolyzed to cause the formation upon standing of the condensed hydrolyzate of the peroxy silane which is a peroxy substituted siloxane. This siloxane can be kept in the water phase until deposition of the copolymer upon a substrate. With heat, the siloxane releases the free radical source by which the copolymer is crosslinked.

As pointed out previously, a further advantage of the use of silyl peroxides for crosslinking the aforementioned polymers resides in the ability of the silyl peroxides to enhance the bonding of the polymer to essentially any substrate to which it contacts at the time it is being crosslinked. Thus, if the polymer containing the silyl peroxide is crosslinked while directly in contact with another surface, the polymer will be tenaciously bonded to that substrate. This is accomplished with essentially any substrate. Thus the silyl peroxide not only serves to effectively and fully crosslink the polymer but also can act as a coupling agent to enhance bonding of the polymer to essentially any substrate in which it is in contact at the time of crosslinking. The use of silyl peroxides as coupling agents to effect bonding between any two solid surfaces is described in our copending applications, Ser. No. 737,319, filed June 17, 1968, and Ser. No. 831,747, filed June 9, 1969.

Although this invention has been described above with respect to a plurality of details thereof, it is not intended that the invention should be limited thereto. The following examples serve to illustrate modes of practicing this invention and are not intended for the purpose of restricting the invention.

EXAMPLE 1

In to an Erlermeyer flask are placed 11.2 grams (0.1 gram/mole) of triethylene diamine and 40 milliliters of benzene. The solution is cooled in an ice-water bath to about 10° C., and 18 grams of tertiary-butyl hydroperoxide are added. The solution is cooled at said temperature. Thereafter, benzene is evaporated under vacuum, and a white crystalline mass, weighing 23 grams, is obtained. The product is dried under high vacuum at ambient 25° C. The adduct has a melting point of 70–71° C. and decomposes at 155° C.

EXAMPLE 2

The preceding example is reproduced using instead of tert.-butyl hydroxide 80 percent pure cumene hydroperoxide, and the yield of the resulting product is about 100 percent.

EXAMPLE 3

Into a 100 milliliter, 3-neck flask, equipped with a mechanical stirrer, condenser, thermometer, argon inlet and an addition funnel there are placed 10.41 grams of the cumene hydroperoxide-triethyldiamine adduct described in Example 2 and 20 milliliters of dried benzene. The solution is cooled to about 10° C. and 10.86 grams of trimethylchlorosilane is added. An exothermic reaction occurs immediately to produce a white, crystalline material. The reaction is allowed to continue for one hour, and the white crystalline solid is filtered and dried to yield 4.3 grams of a material having a melting point of 316–317° C., at which temperature it decomposes. The benzene solution is concentrated under vacuum to give a greenish, oily liquid in the yield of about 75 percent, 8 grams. The liquid has a decomposition temperature of about 176° C. This peroxy silane from infrared analysis has the following formula:

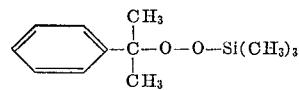

EXAMPLE 4

Into a 100 milliliter, 3-neck flask, equipped with a mechanical stirrer, addition funnel, condenser, thermometer and an argon inlet there are placed 17.52 grams of the adduct of tertiary butyl hydroperoxy-triethylenediamine, as described in Example 1, and 70 milliliters of n-hexane. The slurry is cooled to 3° C. and a solution of 6.46 grams of vinyltrichlorosilane and 10 milliliters n-hexane is added. An exothermic reaction occurs immediately and produces a white solid in the reaction flask. The reaction is allowed to proceed for 40 minutes, and the amine hydrochloride salt (white solids) is filtered off, washed with normal hexane and is dried under vacuum. The hexane solution is concentrated to produce a colorless liquid which is dried with calcium oxide and charcoal to yield 10 grams of product having a decomposition temperature of 150–155° C., characterized by the formula:

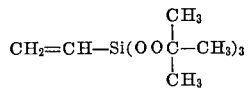

EXAMPLE 5

The process of Example 4 is repeated using allyltrichlorosilane instead of vinyltrichloride silane, and the resulting product has the formula:

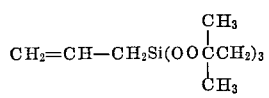

This product decomposes at about 174–175° C. The yield of such product is about 98 percent, based upon the hydroperoxide employed.

EXAMPLE 6

The process of Example 2 is repeated except that the silane is gamma-methacryloxypropyltrichlorosilane and the resulting product has the following formula:

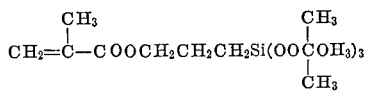

EXAMPLE 7

Employing the procedures of the preceding example using a silane of the formula:

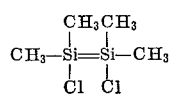

there is obtained a peroxy silane having the formula:

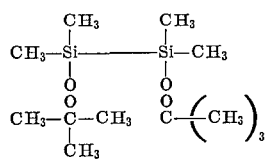

EXAMPLE 8

Using the procedures of the preceding examples with the silane of the following formula:

$$O=C=N(CH_2)_3-Si(Cl)_3$$

and cumene hydroperoxide, there is obtained a silane having the following structure:

EXAMPLE 9

Employing the procedure of the preceding examples and employing a chlorine end-blocked siloxane having the formula $((CH_3)_2SiO)_{10}Cl_2$, there is obtained, with tertiary-butylhydroperoxide the following product:

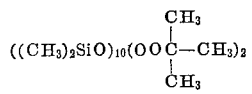

EXAMPLE 10

To a slurry containing 8.76 parts by weight of the adduct of triethylene diamine and tertiary-butylhydroperoxide of Example 1 and 50 parts by weight of n-hexane is added while cooling at approximately 3° C. a solution of 2.85 parts by weight of hexachlorodisiloxane and 10 parts by weight of n-hexane. An exothermic reaction occurs and the reaction is allowed to proceed for one hour, after which the insoluble triethylene diamine-HCl salt is removed by filtration. The filtrate is concentrated under vacuum to give a white crystalline mass which melts at 50° C. Analysis of the mass supports the expected structure:

$$((CH_3)_3COO)_3Si-O-Si(OOC(CH_3)_3)_3$$

EXAMPLE 11

The procedure of Example 10 is repeated except chlorine treated fumed silica filler is employed and it is suspended in n-hexane. The fumed silica has been treated with thionyl chloride at 75° C. for two hours in a closed environment. Analysis of the resulting reaction product shows the presence of tertiary-butylhydroperoxide groups on the silica filler particles and the absence of chlorine.

Example 11 does not encompass the use of a solvent soluble silicon compound which forms a silicon peroxide which is similarly solvent soluble. In this embodiment, the silicon compound has such a high molecular weight and is of such a cross-linked nature that it is insoluble in the solvent. It has surface groups, which are substituted with chlorine which can be peroxidized by reaction with the amine-hydroperoxide adduct. In this embodiment the halo substituted silicon compound is suspended in the solvent and the resulting silicon peroxide is insoluble in the organic solvent and suspended therein. It is separated from the amine hydrohalide at a relatively low temperature by treatment with water or polar solvent which only dissolves the amine hydrohalide salt.

When the process of Example 3 is repeated using the chlorosilane of the Formula $HSCH_2CH_2CH_2-SiCl_3$, it is converted to

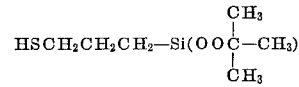

EXAMPLE 12

Into a solution containing 1.4 parts by weight of Hexa [1] and 20 parts by weight of methanol is added at room temperature (25° C.) a solution of 3.60 parts of tertiary-butylhydroperoxide and 10 parts by weight of methanol. The solution is stirred for about 5 minutes. A white crystalline solid is obtained. After removing the methanol under vacuum, it decomposes gradually at 75° C. without melting. The yield of the solid is 53% based on the weight of hydroperoxide used.

EXAMPLE 13

The procedure of the preceding example is repeated using a mole ratio of one mole of Hexa [1] for each hydroperoxy group of the hydroperoxide, and in each case there is obtained good yield of the corresponding adduct of Hexa [1] and the hydroperoxide.

cumene hydroperoxide
methyl hydroperoxide
hydrogen peroxide
2,5-dihydroperoxy-2,5-dimethylhexane
2,7-dihydroperoxy-2,7-dimethyloctane
2,3-dimethyl-3-hydroperoxybutene-1

EXAMPLE 14

Into a solvent slurry of the above Hexa [1] and tertiary-butylhydroperoxide adduct there is added with stirring ---
[1] Hexamethylene tetraamine.

metal salt in the amount indicated in the table below. To the slurry is added with cooling (3° C.) and stirring vinyltrichlorosilane in the amount indicated in the table below. The reaction is typically rapid and exothermic, and on completion thereof, the insoluble Hexa·HCl adduct and the metal salt are removed by filtration and discarded. The product is removed by distillation of the solvent solution and the yield, based on the percent of hydroperoxide employed, of product is indicated below:

| Moles of vinyl trichlorosilane | Moles of Hexa [1] adduct | Inorganic salt | Moles | Solvent | Yield |
|---|---|---|---|---|---|
| 0.11 | 0.50 | CaCl₂ granular | .36 | Hexane | 80 |
| 0.07 | 0.24 | CaCl₂ powder | .27 | Petroleum ether | 80 |
| 0.07 | 0.25 | CaCl₂·2H₂O powder | .27 | Hexane | 93 |
| 0.13 | 0.50 | MgSO₄ powder | .25 | Petroleum ether | 83 |
| 0.06 | 0.25 | do | .13 | Hexane | 64 |
| 0.07 | 0.24 | do | .25 | Petroleum ether | 73 |
| 0.07 | 0.25 | MgSO₄·H₂O powder | 0.27 | Hexane | 57 |
| 0.06 | 0.25 | CaSO₄ powder | 0.22 | Petroleum ether | 60 |

[1] Hexamethylene tetraamine.

EXAMPLE 15

The procedure set forth in the preceding example is repeated with the following chlorosilicon compounds and Hexa [2] peroxide adducts in the mole ratios indicated. The metal salt employed is powdered calcium chloride added to the slurry in an amount 10 mole percent greater than the mole amount of adduct. The solvent is n-hexane. In each case the yield of the silyl peroxide indicated is better than 50 percent based upon the weight of peroxide employed.

EXAMPLE 17

The process of Example 16 is repeated except that instead of employing 8.06 grams of vinyltrichlorosilane, there are employed 8.75 grams of allyltrichlorosilane. The resulting product is a mixture of allyldimethoxy(tertiary-butylperoxy)silane and allylbis(tertiary - butylperoxy) methoxy silane.

EXAMPLE 18

Repeating the procedure of Example 16, there are employed instead of 5.5 grams of sodium methanolate, 8.2 grams of sodium acetate. The resulting product is a mixture of vinyl - diacetoxy(tertiary - butylperoxy)silane and vinyl bis(tertiarybutylperoxy)acetoxy silane.

Similar results are obtained when potassium phenate is substituted for the sodium acetate.

EXAMPLE 19

The vinyldimethoxy(tertiary - butylperoxy)silane, obtained by the vacuum distillation of the mixture of Example 16, is hydrolyzed by adding 5 grams thereof to neutral (pH of 7) water and left there for 48 hours. Upon evaporation of the water under 1 millimeter mercury at 40° C., there is obtained vinyl(tertiary - butylperoxide) siloxane. The siloxane is soluble in toluene. After evaporation of the neutral water used to effect hydrolysis and condensation, the siloxane is not soluble in all proportions in water. This siloxane is capable of polymerizing styrene to a high molecular weight solid polymer by heating it together with styrene to 275° C.

EXAMPLE 20

Into a 100 milliliter, 3-neck flask, equipped with a mechanical stirrer, addition funnel, condenser, thermom-

| Silicon compound | Moles of silicon compound | Hydroperoxide formed as adduct with Hexa | Moles of adduct | Structure of product |
|---|---|---|---|---|
| (A) (SiO₂)₁₅Cl₂₁ [a] | 1 | Cumene hydroperoxide | 25 | (SiO₂)₁₅(OOC(CH₃)₂C₆H₅)₂₁ |
| (B) Chlorinated fumed silica particles [b] | 1 | Tert.-butylhydroperoxide | 10 | Fumed silica containing tert.-butylperoxy groups. |
| (C) Gamma-methylacryloxypropyl-trichlorosilane. | 1 | do | 3 | Gamma-methylacryloxypropyl-tris(tert.-butylperoxy)-silane |
| (D) CH₃SiCl₂H | 1 | Cumene hydroperoxide | 2 | CH₃SiH(OOC(CH₃)₂C₆H₅)₂ |
| (E) Gamma-isocyanatopropyltrichlorosilane. | 1 | Tert.-butylhydroperoxide | 3 | O=C=N(CH₂)₃Si(OOC(CH₃)₃)₃ |
| (F) Trimethylchlorosilane | 1 | 2,5-dihydroperoxy-2,5-dimethylhexane | 1 | 2,5-bis(trimethylsilylperoxy)-2,5-dimethylhexane. |

[a] Partially hydrolyzed Si(OC₂H₅)₄ followed by treatment with thionyl chloride or acetylchloride.
[b] Formed by treated fumed silica at 75° C. with thionyl chloride. The particles are suspended in hexane and mixed with the adduct.

EXAMPLE 16

To a solution of 8.06 grams of vinyltrichlorosilane and 150 grams of n-hexane are added, while cooling to 5° C. with stirring 5.4 grams of sodium methoxide. An exothermic reaction occurs, and after 10 minutes of stirring, 7.3 grams of the adduct of triethylene diamine and tertiary-butylhydroperoxide are added. The reaction is allowed to proceed for an additional 1½ hours, and the insoluble hydrochloride salt of triethylene diamine is removed by filtration. The filtrate is concentrated under vacuum to give a clear liquid containing a mixture of vinyldimethoxy (tertiary - butylperoxy) silane and vinyl bis(tertiary-butylperoxy)methoxy silane. The yield of the liquid is 78 percent based on the weight of hydroperoxide employed.

[2] Hexamethylene tetraamine.

eter and an argon inlet there are placed 17.52 grams of the adduct of tertiary - butylhydroperoxy - triethylene diamine, as described in Example 1, and 70 mlliliters of n-hexane. The slurry is cooled to 3° C. and a solution of 5.45 grams of trichlorosilane and 10 milliliters of n-hexane are added. An exothermic reaction occurs immediately and produces a white solid in the reaction flask. The reaction is allowed to proceed for 40 minutes, and the amine hydrochloride salt (white solid) is filtered off, washed with normal hexane and is dried under vacuum. The hexane solution is concentrated to produce a liquid having formula:

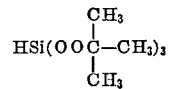

17

When the same mole amount of the triethylene diamine adduct of cumene hydroperoxide is substituted for the tertiarybutylhydroxyperoxy-triethylene diamine above in practicing the above example there is obtained the silane of the formula:

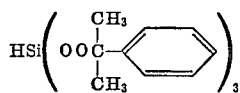

EXAMPLE 21

The process of Example 20 is repeated except instead of employing trichlorosilane, 4.1 grams of dichlorosilane are used and instead of the adduct of tertiary-butylhydroperoxy-triethylene diamine, there is employed ⅔ of the mole amount of the cumene hydroperoxide adduct of Example 2. The resulting product has the formula:

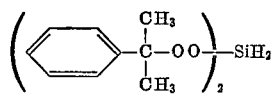

EXAMPLE 22

Repeating the procedures of Example 20, the following halosilanes are reacted with the hydroperoxide amine adducts listed to obtain the indicated peroxy silanes:

| Halosilane | Hydroperoxide amine adduct | Peroxy silane |
|---|---|---|
| $H_3SiBr$ | Hexa[1] adduct of tert.-butylhydroperoxide | $H_3SiOOC(CH_3)_3$ |
| $H_3SiCl$ | Adduct of $HOOC(CH_2)_4COOH$<br>with $CH_3$ and $CH_2$ groups<br>and triethylene diamine. | $H_3SiOOC(CH_2)_4COOSiH_3$<br>with $CH_3$ groups |
| $H_2SiCl_2$ | Adduct of hydrogenperoxide and triethylene diamine | $H_2Si(OOH)_2$ |
| $H_2SiCl_2$ | Mixed adduct of $HOOC(CH_3)_2(CH_2)_4C(CH_3)_2OOH$ and tert.-butylhydrogen peroxide with triethylene diamine. | 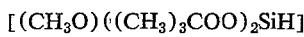 |

[1] Hexamethylene tetraamine.

EXAMPLE 23

To a solution of 6.75 grams of trichlorosilane and 150 grams of n-hexane are added, while cooling to 5° C. with stirring, 5.4 grams of sodium methoxide. An exothermic reaction occurs, and after 10 minutes of stirring, 7.3 grams of the adduct of triethylene diamine and tertiary-butylhydroperoxide are added. The reaction is allowed to proceed for an additional 1½ hours, and the insoluble hydrochloride salt of triethylene diamine is removed by filtration. The filtrate is concentrated under vacuum to give a clear liquid containing a mixture of dimethoxy(tertiary - butylperoxy)silane [$(CH_3O)_2((CH)_3COO)SiH$] and bis(tertiary-butylperoxy)methoxysilane

[$(CH_3O)((CH_3)_3COO)_2SiH$]

The yield of the liquid is 76 percent based on the weight of hydroperoxide employed.

EXAMPLE 24

The process of Example 23 is repeated except that instead of employing 6.75 grams of trichlorosilane, there are employed 5.05 grams of dichlorosilane. The resulting product is methoxy(tertiary-butylperoxyl)silane

[$(CH_3O)((CH_3)_3COO)SiH_2$]

18

EXAMPLE 25

Two compositions were prepared using a high density polyethylene of injection molding grade having the following properties:

| | |
|---|---|
| Density (ASTM D 1505) | 0.96 |
| Melt index (ASTM D 1238) 190° C., grams/10 mins. | 5.0 |
| Tensile strength (ASTM D 638), p.s.i. | 4,600 |
| Ultimate elongation (ASTM D 638), percent | 15 |
| Secant modulus (ASTM D 638), p.s.i. | 150,000 |

The compositions are as follows:

Composition 1

| | Parts |
|---|---|
| High density polyethylene | 100 |
| Trimethyl(alpha, alpha - dimethylbenzyl peroxy)silane | 4 |

Composition 2

| | |
|---|---|
| High density polyethylene | 100 |
| Dicumyl peroxide | 4 |

Each of the above compositions was prepared by intimately blending a hexane solution of the peroxide with the powdered high density polyethylene followed by evaporation of the solvent leaving the respective peroxy compound behind intimately coated on the powdered high density polyethylene. Each composition was put in a heated platen press at 210° C. for 30 minutes. Then samples were cut from each of the resulting molded plaques produced in the press and tested at 25° C. and 150° C. with the following results:

| Composition | Percent gel | Tensile strength, p.s.i, 25° C. | Percent elongation at 25° C. | 150° C. cross linking modulus, p.s.i. |
|---|---|---|---|---|
| 1 | 95 | 2,500 | 440 | 300 |
| 2 | 96 | 2,400 | 450 | 310 |
| Control | none | 2,900 | 900 | none |

The control in the above table is nothing more than plaques made from the high density polyethylene absence any crosslinking agent. The above examples demonstrate the effectiveness of the crosslinking action of the silyl peroxide. Dicumyl peroxide is regarded to be the most favorable crosslinking catalyst for polyethylene. As shown in the table, essentially the same results can be obtained with the silyl peroxide. However, there is one advantage accruing from the use of the silyl peroxide over dicumyl peroxide as demonstrated in the above example. Dicumyl peroxide produces an unpleasant odor which lingers for a long time after the crosslinked polyethylene has been produced. The advantage is that the resulting crosslinked polyethylene had essentially no odor whereas composition 2 exhibited the normal unpleasant odor of dicumyl peroxide crosslinked polyethylene.

EXAMPLE 26

Example 25 was repeated except that the temperature of the platen press was 150° C. for 5 minutes. Only the sample using dicumyl peroxide was effectively crosslinked indicating that the silyl peroxide possessed a high temperature of decomposition.

EXAMPLE 27

The procedure of Example 25 was repeated except that the temperature, time, and the silyl peroxide employed was varied as set forth in the following table, and the results in each case are noted therein.

Similar results are obtainable in crosslinking a copolymer of ethylene and ethylacrylate (melt index of 10.5 and ethylacrylate content of 18 percent by weight); and an ethylene-acrylic acid copolymer (melt index of 24 and acrylic acid content of 42 percent by weight).

EXAMPLE 30

The procedure of Example 25 was repeated using the polyethylene of Example 28 and 2 weight percent of trimethyl (cumylperoxy) silane to which was provided from a hexane solution 1 percent by weight of the booster set

| Polymer | Silyl peroxide | Amount, percent by weight | Crosslinking temperature, °C. | Length of crosslinking time in minutes | Percent crosslinking | Decomposition temp., °C. of silyl peroxide |
|---|---|---|---|---|---|---|
| High density polyethylene of Example 25. | $(CH_3)_3Si-O-O-C(CH_3)_2C_6H_{11}$ | 2 | 240 | 5 | 70 | 176 |
| Do | $(CH_3)_2Si(O-O-C(CH_3)_2C_6H_{11})_2$ | 2 | 240 | 5 | 15 | 142 |
| Do | $(CH_3)_2Si(O-O-C(CH_3)_3)_2$ | 2 | 220 | 5 | 45 | 185 |
| Do | $CH_3-Si(O-O-C(CH_3)_3)_2$ | 2 | 220 | 5 | 85 | 150 |
| Do | (Silicon compound F) of Example 15 | 2 | 220 | 5 | 74 | |
| Do | Allylmethyl-bis(tert.-butylperoxy)silane | 2 | 240 | 5 | 53 | 170 |
| Do | Allyl tris(tert.-butylperoxy)silane | 2 | 240 | 5 | 61 | 170 |
| Do | $H-Si(O-O-C(CH_3)_3)_3$ | 2 | 210 | 10 | 64 | 120 |
| Do | Hexyl tris(tert.-butylperoxy)silane | 2 | 210 | 10 | 75 | 164 |
| Do | Lauryl tris(tert.-butylperoxy)silane | 2 | 210 | 10 | 70 | 155 |
| Do | $CH_2=CHSi(OOC(CH_3)_3)_3$ | 2 | 210 | 10 | 60 | 154 |
| Do | Gamma-isocyanatopropyl tris(tert.-butylperoxy)silane | 2 | 210 | 10 | 56 | 140 |
| Do | $(CH_3)_3C-O-O)_4Si$ | 2 | 210 | 10 | 10 | 135 |
| Do | $(((CH_3)_3COO)_3Si)_2O$ | 2 | 210 | 10 | 60 | 152 |

EXAMPLE 28

The procedure of Example 25 was repeated with a low density polyethylene (density 0.917; melt index 1.75) using the silyl peroxides, amounts thereof, temperature and time set forth in the following table:

| Silyl peroxide | Percent by weight | Temp., °C. | Cure time/ min. | Percent crosslinking |
|---|---|---|---|---|
| $CH_2=CHSi(OOC(CH_3)_3)_3$ | 2 | 220 | 10 | 70 |
| $CH_2=CHSi(OOC(CH_3)_3)_3$ | 2 | 185 | 30 | 70 |
| 2,5-dimethyl-2,5-bis(triethylsilyl-peroxy)hexane | 3 | 240 | 10 | 67 |
| 2,5-dimethyl-2,5-bis(triethylsilyl-peroxy)hexane | 3 | 185 | 40 | 67 |
| $(CH_3)_3SiOOC(CH_3)_2C_6H_{11}$ | 4 | 240 | 10 | 72 |
| $(CH_3)_3SiOOC(CH_3)_2C_6H_{11}$ | 4 | 185 | 40 | 72 |

EXAMPLE 29

The procedure of Example 25 was repeated with two ethylene-vinylacetate copolymers as set forth in the following table:

forth in the following table which also describes the degree of crosslinking achieved thereby:

| Booster | Crosslinking [a] | Improvement |
|---|---|---|
| Control | 60.4 | |
| Diisopropenylbenzene | 63.9 | 3.5 |
| Diallyldiphenylsilane | 65.3 | 4.0 |
| Tetrallyloxyethane | 65.7 | 5.3 |
| Diallyldimethylsilane | 65.8 | 5.4 |
| Tung oil | 70.4 | 10.0 |
| Divinylbenzene | 71.2 | 10.8 |
| 2,4,6, tris (allyloxy)-s-triazine | 76.8 | 16.4 |

[a] Crosslinking was carried out at 210° C. for a 10-minute cycle.

What is claimed is:

1. In the method of cross-linking a polymer containing recurring ethylene units therein, the improvement which comprises effecting said crosslinking by the decomposition of a silyl peroxide provided in said polymer.

2. The method of claim 1 wherein the silyl peroxide is a peroxy substituted silane wherein the peroxy group is bonded directly to silicon thereof.

| Ethylenevinylacetate copolymer | Silyl peroxide | Percent by weight | Temperature, °C. | Time/ min. | Percent crosslinking |
|---|---|---|---|---|---|
| (a) 10.25 weight per cent vinyl acetate: melt index of 3.0 | Vinyl tris (tert. butylperoxy) silane | 4 | 185 | 15 | 79 |
| (b) 10.25 weight percent vinyl acetate: melt index of 3.0 | do | 2 | 185 | 15 | 70 |
| (c) 32 weight percent vinyl acetate: melt index of 25 | do | 2 | 185 | 15 | 78 |

3. The method of claim 2 wherein the polymer is polyethylene.

4. The method of claim 2 wherein the polymer is a copolymer containing ethylene units therein.

5. A crosslinkable composition comprising a polymer containing recurring ethylene units combined with a silyl peroxide.

6. The composition of claim 5 wherein the polymer is polyethylene.

References Cited

UNITED STATES PATENTS 3,242,159   3/1966   Kaufman _____ 260—94.9

JOSEPH L. SCHOFER, Primary Examiner

W. F. HAMROCK, Assistant Examiner

U.S. Cl. X.R.

260—46.5 VA, 86.7, 78.5 BB, 87.3, 80.3 R, N, E, 87.5 R, 80.75, 87.7, 80.8, 88.25, 80.81, 96 R, 85.3 C

UNITED STATES PATENT OFFICE
CERTIFICATE OF CORRECTION

Patent No. 3,631,161     Dated December 28, 1971

Inventor(s) You-Ling Fan et al

It is certified that error appears in the above-identified patent and that said Letters Patent are hereby corrected as shown below:

Column 2, line 46, "fre" should read --free--. Column 6, line 24, in the formula, "$X_2$" should read --$X_z$--. Column 12, line 20, "In to" should read --Into--. Column 13, line 13, that portion of the formula "(OOCCH$_2$)$_3$" with CH$_3$ groups 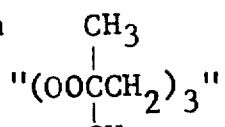

should read --(OOCCH$_3$)$_3$-- 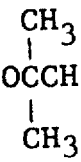 ; line 26, that portion of the formula "(OOCOH$_3$)$_3$" 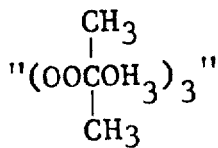 should read --(OOCCH$_3$)$_3$-- 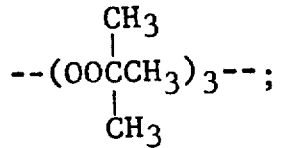 ;

Column 13, line 35, that portion of the formula "Si=Si" should read --Si-Si--.

Signed and Sealed this twenty-third Day of December 1975

[SEAL]

Attest:

RUTH C. MASON
*Attesting Officer*

C. MARSHALL DANN
*Commissioner of Patents and Trademarks*